Dec. 23, 1952 — A. KLEIN — 2,622,702

AUTOMOBILE TRACTION DEVICE

Filed Jan. 18, 1952 — 2 SHEETS—SHEET 1

INVENTOR.
Arthur Klein
BY
Wood, Herron & Evans
ATTORNEYS.

Dec. 23, 1952 — A. KLEIN — 2,622,702
AUTOMOBILE TRACTION DEVICE
Filed Jan. 18, 1952 — 2 SHEETS—SHEET 2
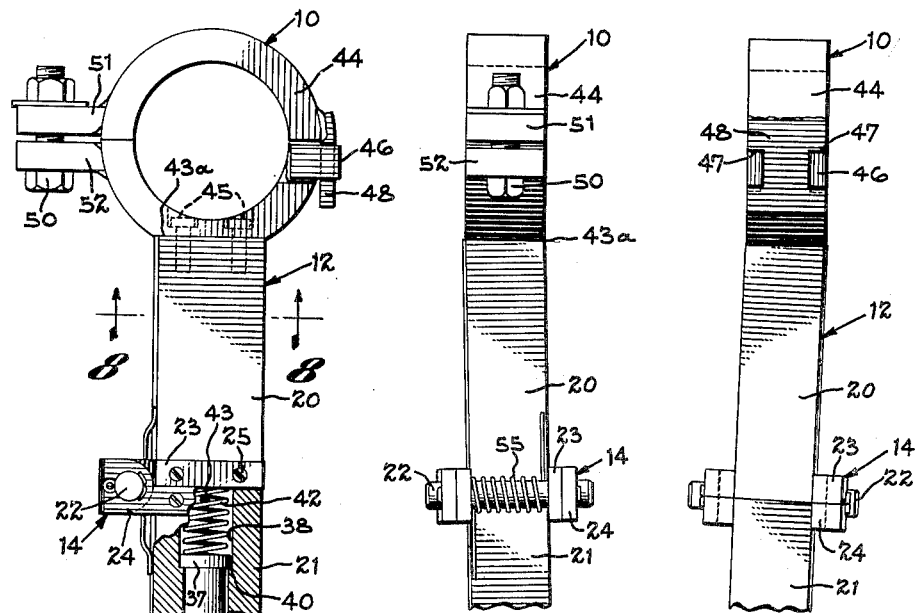
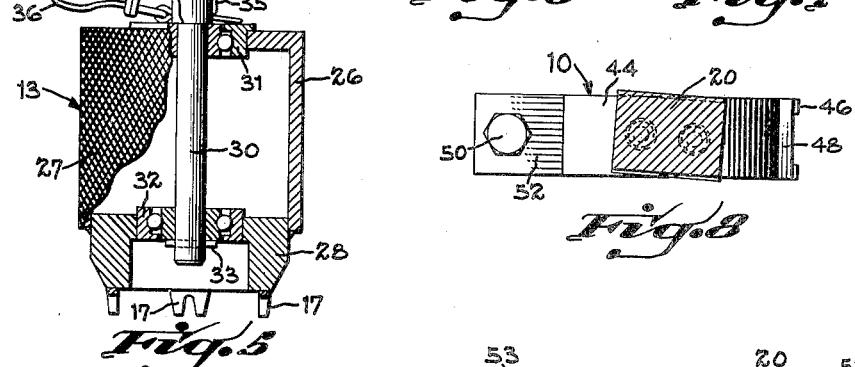
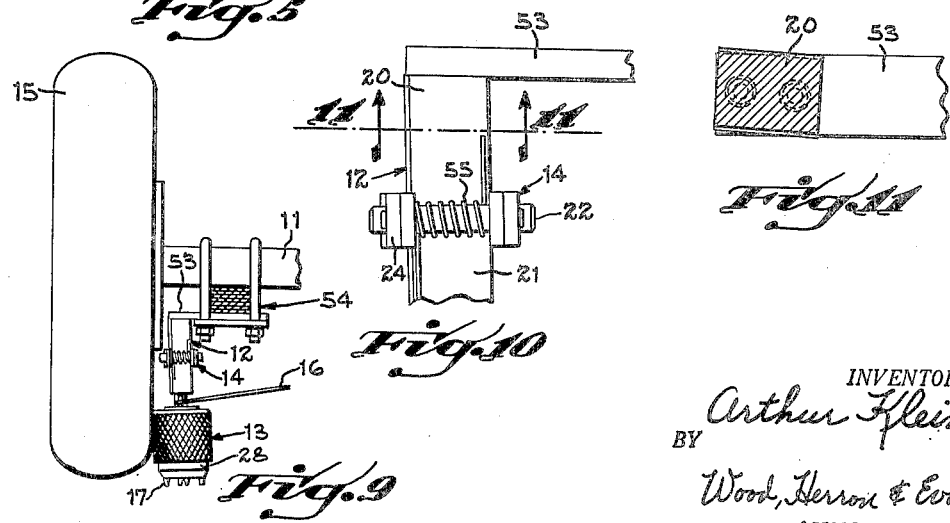
INVENTOR.
Arthur Klein.
BY Wood, Herron & Evans.
ATTORNEYS.

Patented Dec. 23, 1952

2,622,702

UNITED STATES PATENT OFFICE 2,622,702

AUTOMOBILE TRACTION DEVICE

Arthur Klein, Cincinnati, Ohio

Application January 18, 1952, Serial No. 267,167

4 Claims. (Cl. 188—4)

This invention is directed to a traction device which is adapted for use on automobiles, trucks, buses and the like. The present device is more in the nature of an ice creeper than an anti-skid device and is intended to be used for short distances only in starting an automobile on icy streets, or under certain conditions to be used as a traction device for stopping an automobile on ice.

In other words, the present device is intended for use under those conditions which prevail during most of the winter in a great number of northern cities where the roads and highways are cleared and perfectly safe for travel without anti-skid chains or other devices, but where curb areas, side roads and driveways have residual ice and hard packed snow upon them which make starting, stopping and parking off the cleared ways difficult or impossible.

It is an objective of the invention to provide a device of the type described which is mounted and arranged so that it can be moved from an ineffective position to an effective position under the control and at the will of the operator of the vehicle.

A further objective is to provide a device of the type described which, when in the effective position, is subjected to forces which tend to retain it in said position.

A further objective is to provide a traction device embodying a cylindrical member which is adapted to be rotated through contact with a rear tire of a vehicle, the member also including ground or ice engaging lugs which, upon rotation of the cylindrical member, drive the car forward.

An additional object of the invention is to provide a device of the nature described which is adapted to be mounted upon automobiles of various rear axle constructions, the device itself functioning independently of the type of attachment required by the various constructions.

Other objects and advantages of the invention will be more fully explained in connection with the following description of the drawings in which:

Figure 5 is an enlarged side view of the device, with parts broken away to show certain details of construction.

Figure 6 is a side elevational view of the upper portion of Figure 5.

Figure 7 is a view similar to Figure 6 illustrating the side opposite that shown in Figure 6.

Figure 8 is a fragmentary cross sectional view taken on line 8—8 of Figure 5.

Figure 9 illustrates a modified form of means for attaching the device to an automobile.

Figure 10 is an enlarged elevational view of the upper portion of the device shown in Figure 9.

Figure 11 is a fragmentary cross sectional view taken on the line 11—11 of Figure 10.

Generally speaking, the traction device of this invention includes a bracket 10, by which it is affixed to a rear axle housing 11, a support arm 12, which depends from the bracket, and a cylindrical member 13 which is rotatably journalled upon the support arm. The arm 12 is hinged as at 14 between the bracket 10 and member 13 so the cylindrical member can be lowered or raised into and out of effective operative position. This position is one in which the cylindrical member 13 is directly below the axle housing and against the inner side wall of the tire indicated at 15. Raising may be accomplished through a cable attached to an appropriate lever, crank or other operating expedient, located near the driver's seat of the vehicle as suggested by U. S. Patents Nos. 2,295,837 and 2,283,948.

Figure 1:
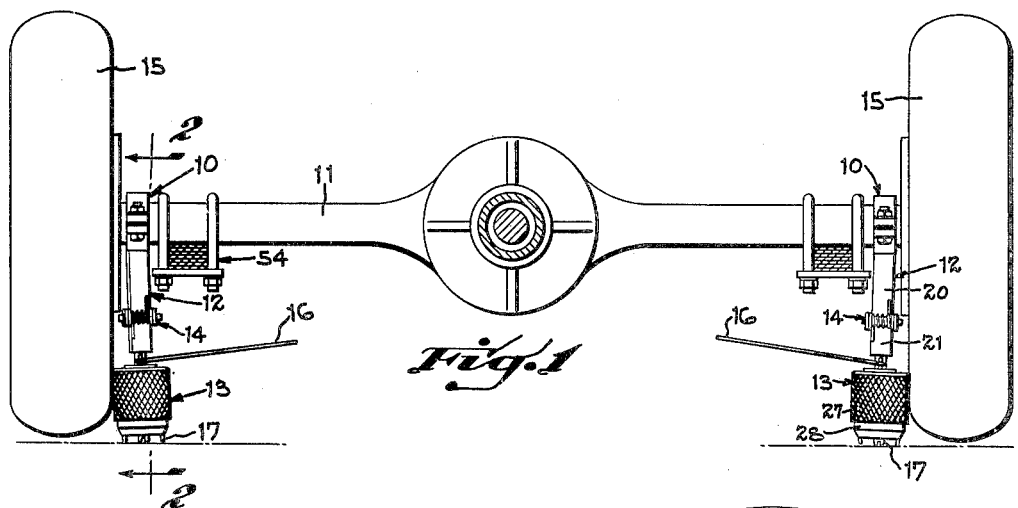
Figure 1 is an elevational view of the rear axle of an automobile, looking from the front toward the rear, showing a pair of the traction devices of this invention mounted in place upon the axle.

Preferably the traction device is employed in pairs with one located adjacent each of the rear wheels of the vehicle as shown in Figure 1. Under these circumstances, a pair of cables 16 is utilized, the pair being connected to a common lead as suggested in the above mentioned patents, or arranged so that they can be controlled individually if desired. The latter arrangement may be desirable under a condition in which the vehicle is against an icy curb and traction needed only at the right one of the two rear tires.

It is to be noted that the cylindrical member 13 when in operating position is canted with relation to the vertical so that its axis of rotation slants outwardly and upwardly relative to the inner face of tire 15. As a result of this canted relationship, lugs 17 on the bottom of cylindrical member 13, which are arranged in spaced relationship and annularly with respect to the axis of rotation of the cylindrical member 13, are brought one at a time into contact with the icy surface or ground in such a way that a forward motion is imparted to the automobile upon the rotation of the cylindrical member, this rotation being brought about by its contact with tire 15. Otherwise expressed, the lugs on the bottom of the cylindrical member are brought into contact when they are at the side of the cylindrical member adjacent the tire and moving in the general direction of tire movement when the tire is turning so as to move the car forward.

Figure 2:
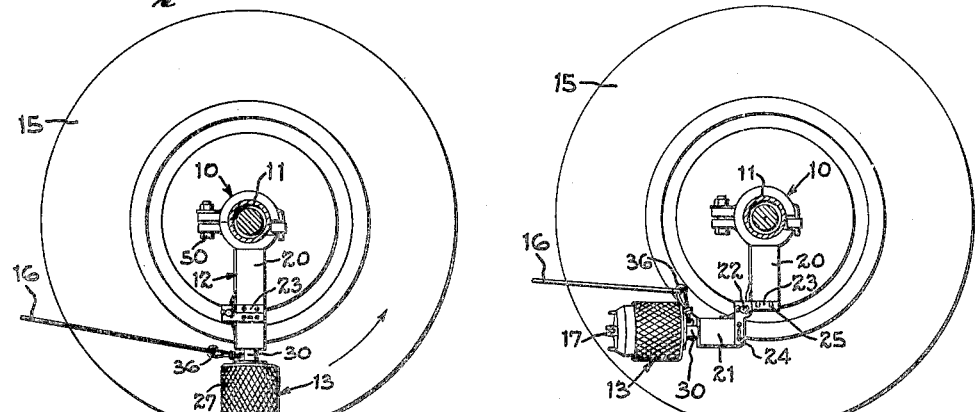
Figure 2 is a cross sectional view taken on the line 2—2 of Figure 1, showing the traction device in effective or lowered and operative position.

In addition to the above described canted relationship, the arm 12 and its hinge member 14 are arranged relative to bracket 10 such that the cylindrical member, when swung down into effective position, moves through a plane which is canted with respect to the plane of rotation of tire 15. This causes the cylindrical member to move toward the inner side wall of the tire as it is lowered. The result of this canted or slanting relationship is that the outer surface of the cylindrical member is literally wedged against the inner face of the tire as it swings down from the position shown in Figure 3 to the position shown in Figure 2. Thus, as the tire rotates in the direction indicated by arrow in Figure 2, the down position and the resulting frictional engagement between the cylindrical member and the tire is not only maintained, but the tendency is for the force of contact between the tire and the member to increase.

Considering the two canted or slanted relationships together (1) of the arc of the swing of member 13, and (2) the disposition of the member 13 relative to the tire, it will be seen that when the member is being lowered into effective operating position, the axis of cylindrical member 13 moves through a plane which intersects the plane of rotation of the tire along a line which is to the rear of the axis of rotation of the tire, and which slants downwardly toward the rear of the automobile. Otherwise expressed, the axis of cylindrical member 13, upon lowering, moves through a plane which forms, with the plane of rotation with the tire, a wedge that converges upwardly and rearwardly with respect to the axis of rotation of the tire.

Figure 3:
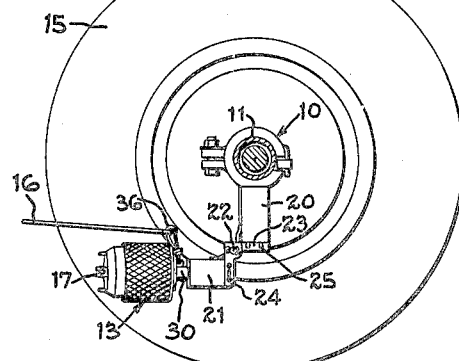
Figure 3 is a view similar to Figure 2 showing the device in raised or ineffective position.
Figure 4:
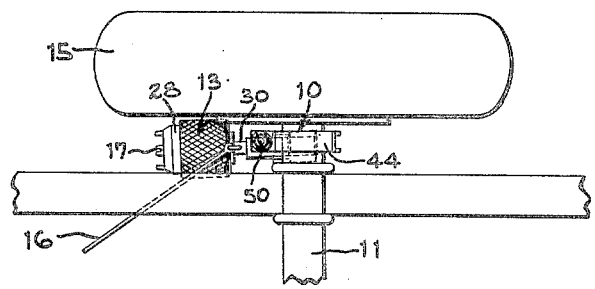
Figure 4 is a top plan view showing the device in raised position.

Described in more specific detail, arm 12 comprises an upper part 20 and a lower part 21 which are joined by hinge member 14. The hinge may comprise a pin 22 which pivotally joins upper hinge journals 23 and lower hinge journals 24, the respective journals 23 and 24 being fastened to the respective upper and lower parts 20 and 21 of arm 12 by bolts 25. The hinge pin 22, as shown in Figure 3, must be disposed with relation to the upper and lower parts 20 and 21 of the arm in such a way that cylindrical member 13 swings generally forwardly with respect to the automobile upon being raised.

Member 13 comprises a cylindrical shell 26 which has its outer surface either knurled as shown at 27 or otherwise scored or grooved to increase the friction existing between it and the tire when the shell is in operative contact with the tire. The bottom of cylindrical shell 26 is closed by a plug 28, this plug having the above referred to lugs 17 welded to its lower face. Shell 26 is rotatably journalled upon a shaft 30, a pair of upper and lower ball bearings 31 and 32 respectively, being employed to insure that shell 26 is free to rotate with respect to the shaft. The lower end of shaft 30 has a cross pin 33 in it upon which rests the inner race of lower ball bearing 32. At the upper end a shoulder 34 bears against the inner race of ball bearing 31 so that the shell is restrained against axial movement with respect to shaft 30. Immediately above shoulder 34, a cotter pin 35 extends through shaft 30 with the loop end of the cotter pin enclosing the eye of a spring clip 36. The spring clip 36 serves as an attachment for cable 16. The upper end of shaft 30 has a collar 37 formed on it, which is slidably disposed within a bore 38 in the upper portion of part 21 of arm 12, and is designed to engage a shoulder 40 defined where a smaller bore 41 in the lower portion of part 21 meets bore 38. Within the upper or larger bore a heavy coil spring 42 is disposed, this spring being anchored at its upper end by a cross pin 43 and under compression between this pin and the upper end of shaft 30. It will be seen, therefore, that shaft 30 is constantly urged outwardly or downwardly by spring 42 and thus the lugs 17 urged into gripping relationship with the ice or any other surface upon which the tire is resting. The coil spring also affords some degree of vertical movement of member 13 so that it can be swung into the completely down position. The spring also permits the member 13 to move up and down, within limits, to conform to uneven road conditions.

In the instance shown in Figures 1–8, the arm is connected to a flattened surface 43a on the bottom of a ring clamp 44 by means of a pair of bolts 45 which are seated in the ring clamp and threaded into appropriate bores in the upper end of arm 12. In order to facilitate installation clamp 44 is split. The lower section, at the right side as viewed in Figure 5, has a pair of fingers 46 extending into a pair of mating notches 47 which are cut into a T plate 48 welded to the upper portion of the clamp. At the side opposite, the two parts of the clamp are fastened together by means of a bolt 50 which passes through flanges 51 and 52 secured to the upper and lower parts of the clamp respectively. The above described split clamp is designed to encircle the axle housing 11 of vehicles adapted for such installation. Where this type attachment is not practical, attachment can be made by means of a plate or flat bar 53 which is bolted to the top of arm 12 and clamped in the spring shackle, indicated generally at 54. In order to thus affix plate 53 the shackle bolts may be loosened and the plate 53 slipped between the spring and shackle plate and then the bolts re-tightened. (In certain installations it may be necessary to procure longer shackle bolts to accommodate the plate.)

The above mentioned canted or slanted relation of the cylindrical member with respect to the automobile tire may be accomplished by means other than those shown. However, preferably, in order to cant the cylindrical member so as to bring the lugs at one side only in contact with the surface upon which the tire is resting, the upper end of arm 12 is machined or otherwise cut so as to present a slanting surface to either the ring clamp, if it is used, or the plate 53 if it is used. In the instance, the face or upper end of the arm is cut so that it slants downwardly and inwardly in each member of the pair as viewed in Figure 1. The other cant may be obtained by twisting the arm slightly with respect to the axis of the ring clamp (and thus the axle housing 11) or by twisting it slightly with respect to plate 53. The twisted relation of arm 12 with respect to split ring clamp 44 is illustrated in Figure 8 and its relation with respect to plate 53 shown in Figure 11.

Although only two means for installing or affixing the traction device are shown in the drawings, it will be obvious that others may be utilized as long as some means is provided for disposing hinge pin 22 in a position which will insure that the double cant relationship of the cylindrical member 13 is obtained, or as long as means the equivalent of hinge pin 22 is arranged to provide the double cant.

In the drawings, a coil spring 55 is associated with hinge pin 22 and arranged to urge arm 12 toward the straight or vertical position; that is, one in which cylindrical member 13 is in operating or effective position. For this purpose the spring is coiled upon pin 22 with one end pressing against part 20 of the arm and the opposite end pressing against part 21 of the arm. The spring is utilized to insure that arm 12 extends rapidly upon the release of cables 15. It will be obvious, however, that the weight of the cylindrical member 13 alone may be sufficient to insure its coming into operative position in most circumstances.

Having described my invention I claim:

1. A traction device for motor vehicles adapted to be clamped to the rear axle housing of said vehicle adjacent a rear tire thereof, said traction device comprising an arm, means fastening said arm to said rear axle housing, a cylindrical member rotatably journalled by said arm, a plurality of lugs on the bottom of said cylindrical member, and said arm adapted to be disposed so as to position said cylindrical member against the inner side wall of said rear tire in frictional driving contact therewith and with the cylindrical member canted outwardly with respect to the plane of rotation of said tire and with the lugs on the bottom of the cylindrical member adjacent the tire engaging the surface upon which the tire is resting, whereby the lugs on the bottom of the cylindrical member adjacent the tire move in the direction which drives the vehicle forward upon forward rotation of said tire and the cylindrical member by said tire.

2. A traction device for motor vehicles comprising a cylindrical member having a plurality of lugs on the bottom thereof, and means rotatably supporting said cylindrical member in frictional driving contact with the inner side wall of a rear tire of said vehicle, said means arranged to provide an outward canted relationship of the axis of rotation of said cylindrical member with respect to the plane of rotation of said tire, whereby the lugs on the bottom of the cylindrical member adjacent the tire are caused to move in a direction which moves the vehicle forward upon forward rotation of the tire.

3. A traction device for motor vehicles, said device comprising a cylindrical member, an arm rotatably journalling said cylindrical member, means for securing the arm to the vehicle adjacent a rear tire thereof, a hinge in said arm, said arm arranged and disposed so that upon bending of the arm at said hinge the cylindrical member is swung through an arc in which its axis of rotation defines a plane which slants outwardly, upwardly and to the rear of the vehicle with respect to the plane of rotation of said rear tire to bring the cylindrical member into driving contact with the inner side wall of said rear tire at a place adjacent the surface upon which the tire is resting, and a plurality of surface engaging lugs depending from the bottom of said cylindrical member.

4. A traction device for a motor vehicle, said traction device comprising an arm adapted to be secured to said vehicle adjacent a rear tire thereof, a cylindrical member rotatably journalled by said arm, a hinge in said arm, a plurality of annularly disposed lugs on the bottom of said cylindrical member, and said arm and hinge arranged to permit the cylindrical member to be swung through an arc which lies in a plane defining with the plane of rotation of said rear tire a wedge which converges upwardly and rearwardly of the vehicle, whereby the cylindrical member when swung into a position in which it contacts the inner side wall of said rear tire adjacent the ground is canted with respect to said rear tire to bring the lugs at the side of the member adjacent the tire into ground engaging position.

ARTHUR KLEIN.

REFERENCES CITED

The following references are of record in the file of this patent:

UNITED STATES PATENTS

| Number | Name | Date |
|---|---|---|
| 2,006,210 | Bruffee | June 25, 1935 |
| 2,295,837 | Gerth | Sept. 15, 1942 |
| 2,442,322 | Daley | May 25, 1948 |

FOREIGN PATENTS

| Number | Country | Date |
|---|---|---|
| 24,250 | Great Britain | Oct. 31, 1906 |